United States Patent [19]

Shue

[11] 3,855,329

[45] Dec. 17, 1974

[54] OLEFIN COUPLING IN THE PRESENCE OF PALLADIUM CARBOXYLATES

[75] Inventor: Robert S. Shue, Bartlesville, Okla.

[73] Assignee: Phillips Petroleum Company, Bartlesville, Okla.

[22] Filed: Mar. 8, 1973

[21] Appl. No.: 338,809

Related U.S. Application Data

[62] Division of Ser. No. 214,399, Dec. 30, 1971, Pat. No. 3,775,511.

[52] U.S. Cl............. 260/668 R, 260/592, 260/599, 260/668 C, 260/669 P

[51] Int. Cl............................................ C07c 15/12

[58] Field of Search............ 260/668, 669 R, 669 P, 260/668 C

[56] References Cited

UNITED STATES PATENTS

| | | | |
|---|---|---|---|
| 3,674,884 | 7/1972 | Moritani et al. | 260/669 R |
| 3,689,583 | 9/1972 | Kominami et al. | 260/669 R |

Primary Examiner—C. Davis

[57] ABSTRACT

Oxidative coupling of olefins having at least one olefinic hydrogen in the presence of palladium carboxylates.

4 Claims, No Drawings

OLEFIN COUPLING IN THE PRESENCE OF PALLADIUM CARBOXYLATES

This is a division of application Ser. No. 214,399, filed Dec. 30, 1971 now U.S. Pat. No. 3,775,511.

BACKGROUND OF THE INVENTION

This invention relates to a process for oxidatively coupling an olefin and an aromatic compound to form the corresponding arylolefin in the presence of palladium carboxylate. In accordance with another aspect, this invention relates to a process for oxidatively coupling an olefin and an aromatic compound that is catalyzed by a palladium carboxylate. In accordance with a further aspect, this invention relates to a process for the intermolecular oxidative coupling of olefins in the presence of a palladium carboxylate.

The oxidative coupling of olefins and aromatic compounds, referred to hereinafter as olefin arylation, in the presence of a palladium carboxylate has been previously described. For example, I. Moritani and Y. Fujiwara, Tetrahedron Letters No. 12, page 1,119 (1967), reported the reaction of benzene with the palladium chloride complex of styrene in the presence of acetic acid to form stilbene. However, the reaction resulted in extensive by-product formation in the form of the undesired ester, alpha-phenylethylacetate. In addition, the reaction was not catalytic.

It was later shown that stilbene could be prepared, directly from styrene and benzene in the presence of an equivalent amount of palladium (II) acetate and sodium acetate in acetic acid solution. See Y. Fujiwara, et al., Tetrahedron Letters, 633 (1968). However, palladium acetate does not act as a catalyst in this reaction as a full equivalent of the salt is required.

That a combination of palladium acetate and silver or cupric acetate can function catalytically in the coupling of stryene with benzene to form stilbene in acetic acid solution was later demonstrated. See Y. Fujiwara, et al., Tetrahedron Letters, 3863 (1968). When the olefin employed was ethylene, stilbene, which results from the diarylation of ethylene, rather than styrene was the major product.

The prior art process suffers from the shortcoming that when olefin arylation is conducted in the presence of acetic acid solvent, the use of simple olefins, i.e., hydrocarbons such as propylene and butadiene, results in extensive reaction of the solvent with the olefin causing formation of the olefin acetate. See S. Danno, et al., Tetrahedron, 25, 4,809 (1969).

Considering the present state of the art, it can readily be seen that a process which would eliminate or minimize the disadvantages inherent in the presently used processes would be a welcome advance.

SUMMARY OF THE INVENTION

It is an object of this invention to provide an improved process for the arylation of olefins.

Another object of this invention is to provide a process for the arylation of olefins in the presence of metal salt which is catalytic with respect to the metal salt but does not require the presence of an additional catalyst such as silver or cupric acetate.

A further object of this invention is to provide an improved process for the direct intermolecular oxidative coupling of olefins.

In accordance with this invention there is provided an improved process for olefin arylation whereby the formation of olefin carboxylates and polyarylation of olefins is minimized in the reaction of an olefin with an aromatic compound in the presence of a palladium carboxylate. This is accomplished by conducting the reaction of the olefin and aromatic compound in the presence of a large excess of the aromatic. It has also been found that by so doing the need for added acetic acid and adjuvants, such as alkali metal acetates, is eliminated.

Further in accordance with this invention, there is provided an improved process whereby the olefin arylation can be conducted in such a way as to be catalytic with respect to palladium carboxylate. This is done by conducting the reaction in a large excess of the aromatic compound in the presence of oxygen above about at least 50 psig and at temperatures from room temperature and above. When the oxygen pressure is at least about 150 psig it has been found that none of the palladium carboxylate catalyst is converted to palladium metal and the need for a reoxidation catalyst is eliminated.

Further in accordance with this invention, there is provided a method for causing the intermolecular oxidative coupling of olefins to yield conjugated dienes. This can be accomplished by contacting the olefin in a suitably inert nonaromatic solvent such as chloroform or a halocarbon solvent such as carbon tetrachloride with a palladium (II) carboxylate. This reacation becomes catalytic in the presence of oxygen.

DESCRIPTION OF THE PREFERRED EMBODIMENTS

The overall sequence of the olefin arylation reaction scheme is generally believed to occur as follows:

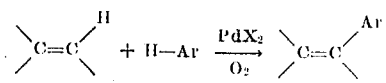

wherein X is a monovalent anion and Ar is an aromatic hydrocarbyl radical.

The result of this reaction is to cause the oxidative coupling of the olefin and aromatic compound to form an olefinic-substituted aromatic compound. Oxidative coupling requires the olefin moiety to contain a hydrogen atom attached to a carbon atom involved in the carbon-carbon double bond. Theoretically at least, all such hydrogens of each olefinic moiety present can be replaced in this substitution reaction. For example, ethylene has 4 vinyl hydrogens, all potentially subject to olefin arylation.

It can also be seen that the aromatic reactant must contain at least 1 hydrogen atom attached to the aromatic nucleus if substitution is to occur. Theoretically, at least, all such hydrogens can be replaced in this substitution reaction. For example, benzene has 6 such hydrogens while toluene has 5.

The palladium salt used to promote the coupling is one in which palladium is divalent, i.e., in the +2 oxidation state. In reactions wherein palladium acts as a catalyst, it is effectively maintained in the +2 oxidation state but in runs wherein palladium is not acting catalytically, it is reduced to palladium(0).

In addition to olefin arylation as described above, a number of other possible reactions can simultaneously occur. The starting olefin or a subsequent olefin product can be oxidized to a ketone or aldehyde. For example, styrene can be oxidized to benzaldehyde or acetophenone.

Another simultaneous reaction is olefin-olefin oxidative coupling whereby two molecules of olefin can couple. For example, the formation of 1,4-diphenyl-1,3-butadiene results from the olefin-olefin coupling of styrene.

Olefin Reactant

The olefins which can be used in the novel processes of this invention can generally be described as those cyclic or acyclic olefins having at least 1 olefinic carbon-carbon double bond with the further proviso that at least 1 of the olefinic carbons must have at least 1 hydrogen atom attached thereto. The process is also applicable to olefins having 2 or more olefinic carbon-carbon double bonds, including conjugated double bonds. However, every olefinic carbon-carbon double bond that undergoes substitution must have at least 1 hydrogen atom attached thereto.

Although not limited thereto, the olefins preferred for use in this invention are those having 2–20 carbon atoms per molecule. The olefinic molecule can contain substituents that are not deleterious to the reaction. Such substituents include alkyl, cycloalkyl, aryl, alkaryl, aralkyl, and the like, as well as non-hydrocarbon moieties such as halogens, ether, ester, nitro or ketone groups and the like. Substituents that are known catalyst poisons for noble metals such as mercapto, hydroxy and primary or secondary amino groups are not suitable.

Suitable olefinic compounds include, but are not limited to, the following: ethylene, propylene, butene-1, butene-2, isobutene, hexene-1, hexene-3, decene-1, eicosene-1, allene, butadiene-1,3 isoprene, 1,5-hexadiene, 1,4,7-octatriene, cyclohexene, methylenecyclohexane, cyclooctene, 3-methylcyclohexene, 3-phenylpropene, vinylcyclohexane, styrene, p-methylstyrene, octene-2, norbornene, norbornadiene, p-nitrostilbene, m-chlorostilbene, allyl acetate, crotonaldehyde, crotonic acid, ethyl vinyl ether, benzyl vinyl ether, cyclohexyl vinyl ether, phenyl vinyl ether and the like.

Aromatic Reactant

Aromatic compounds which can be used in this invention are those having at least one aromatic ring system bearing at least 1 hydrogen atom. Suitable aromatic compounds include, but are not limited to, benzene and its substituted derivatives having up to and including about 20 carbon atoms per molecule. It is desirable that the compound be a liquid at the temperature of the reaction since it normally is used in excess as the reaction diluent. For that reason the aromatic compounds preferred are liquids or solids melting under about 150°C. Suitable substituents can be alkyl, aryl, cycloalkyl, alkaryl, aralkyl, cycloalkalkyl, alkcycloalkyl, and the like, and groups such as halogens, ether, ester, nitro, or ketone groups and the like. Substituents that are known catalyst poisons for noble metals such as mercapto, hydroxy, and primary or secondary amino groups are not suitable.

Suitable aromatic compounds include, but are not limited to, the following: benzene, toluene, the xylenes, ethylbenzene, cumene, pentamethylbenzene, 2-butylbenzene, t-butylbenzene, neopentylbenzene, cyclohexylbenzene, 4-methylcyclohexylbenzene, cyclopentylbenzene, cyclooctylbenzene, anisole, ethoxybenzene, cyclohexyl phenyl ether, nitrobenzene, ethyl benzoate, benzonitrile, phenyl acetate, benzaldehyde, acetophenone, chlorobenzene, isobutyl benzoate, biphenyl, 2,2'-dimethylbiphenyl, diphenyl ether, tetradecylbenzene, diphenylmethane, 1,2-diphenylethane, 1,8-diphenyloctane, and the like.

Palladium Carboxylate Coupling Promoter

The palladium compounds that may be used in this invention are the palladium (II) carboxylates (palladium salts of organic acids). To be suitable, the palladium (II) carboxylate must be soluble in the reaction medium. Therefore, it is preferred to use those having 1–10 carbon atoms as these generally exhibit solubility in the medium comprised of olefin and aromatic compound which is normally employed.

A method for preparing palladium (II) carboxylates is described by T. A. Stephenson, et al., J. Chem. Soc., 3,632 (1965).

Suitable palladium (II) carboxylates include, but are limited to, the following: acetate, propionate, isovalerate, caproate, benzoate, toluate, paranitrobenzoate, metanitrobenzoate, parachlorobenzoate, metachlorobenzoate, chloroacetate, trifluoroacetate, phthalate, and the like.

Organic acids which would contain substituents such as mercapto, hydroxy and primary or secondary amino groups which are known catalyst poisons for noble metals are not suitable.

Definition of Terms

In the course of describing this invention certain terms have been used for convenience. The definitions of these terms will be helpful in appreciating the nature of this invention.

Yields of products obtained will be given based on the amount of palladium(II) carboxylate present and are determined according to the equation:

Yield = $AC/B \times 100\%$ wherein A represents moles of product formed, B represents moles of monomeric palladium(II) compound charged to the reaction, and C represents moles of monomeric palladium(II) compound necessary to produce one mole of product under noncatalytic conditions. In the case of the reaction of benzene with ethylene to form styrene, one mole of palladium(II) carboxylate would be required under noncatalytic conditions. The additional reaction wherein the stryene formed undergoes a second arylation to form stilbene requires an additional mole of palladium(II) carboxylate. As can be readily seen, in the arylation of ethylene with benzene the value of C/B for styrene formation is 1 and the value of C/B for a second arylation to form stilbene would be 2. However, if the initially charged olefin is styrene itself, the value of C/B for the formation of stilbene would be 1. A cumulative yield of products that exceeds 100 percent shows the reaction to be catalytic.

Another term which will be useful in appreciating the nature of this invention is "selectivity." It can be considered to be a measure of how efficiently a product of the reaction, either a desired product or a product of a side reaction, is produced under a given set of reaction variables. Selectivity may be based on the amount of olefin that is consumed or the amount of palladium-(II) carboxylate conversion to palladium metal. The selectivity based on olefin conversion, termed S, expresses the percentage portion of the olefin that reacts to form a particular product observed. It is obtained from the equation:

$$S = AD/(E-F) \times 100\%$$

wherein A is as defined above; D is a stoichiometric factor equal to the moles of olefin required to form one mole of the product; E is the moles of olefins charged; and F is the moles of unreacted olefin recovered.

In the case of olefin mono-arylation, a high selectivity to the compound resulting from a coupling of the olefin with single mole of the aromatic compound relative to the selectivity to other products is desired.

The selectivity, termed $S_{PD}$, expresses the percentage portion of the palladium carboxylate converted to palladium metal that resulted in the formation of a particular product. It is obtained from the equation:

$$S_{PD} = AC/G \times 100\%$$

wherein A and C are as defined above and G is the gram atoms of palladium metal recovered. This selectivity is generally applicable to noncatalytic reactions.

Another useful term expresses the percentage of olefin actually consumed in the reaction based on the amount of olefin charged and is termed $C_o$. It is calculated from the equation:

$$C_o = (F-F)/E \times 100\%$$

wherein E and F are as defined above.

Still another useful term expresses the percentage of palladium carboxylate converted to palladium metal and is termed $C_{PD}$. It is derived from the equation:

$$C_{PD} = G/B \times 100\%$$

wherein B and G are as defined above.

The process of oxidatively coupling an olefin and an aromatic compound and the intermolecular oxidative coupling of olefins can be optionally made catalytic or noncatalytic (depending upon whether or not oxygen is present). In either case, the solvent will be an aromatic compound or a suitably inert nonaromatic solvent. This prevents the formation of the olefin carboxylate formed using the prior art process wherein a carboxylic acid is employed in the reaction medium.

Noncatalytic Olefin Arylation

The noncatalytic process is characterized by the irreversible conversion of the palladium(II) carboxylate coupling promoter to palladium metal. The process may be conducted under a variety of conditions.

Since the palladium(II) carboxylate is irreversibly reduced to palladium metal, the stoichiometry of the reaction requires one mole of palladium(II) carboxylate for each reactive olefinic hydrogen that is to be substituted by an aromatic residue.

Although not restricted thereto, it is usually desired to substitute a single vinyl hydrogen per mole of olefin. When that is the case, the mole ratio of palladium(II) carboxylate to olefin can vary over the range from about 0.1:1 to 1:1. The use of less palladium(II) carboxylate than the theoretical stoichiometry requires is usually done to avoid polyarylation. As the starting olefin is consumed, the desired product of olefin arylation may itself become subject to further arylation. The use of less than the stoichiometric amount of palladium(II) carboxylate necessarily will result in less than 100 percent consumption of the starting olefin. In order to avoid a large percentage of unconverted olefin while also avoiding extensive polyarylation it is preferred to use a mole ratio of coupling promoter to olefin varying from about 0.5:1 to 1:1.

The mole ratio of aromatic compound to olefin may vary over a wide range since, in addition to being a reactant, the aromatic compound is usually employed as a solvent medium for the reaction. It has been found that the formation of products arising from the reaction of the olefin with the carboxylic acid used as a solvent in the prior art can be eliminated by using the aromatic compound as the solvent by employing more than the stoichiometry of the reaction requires. Since, as pointed out above, it is possible to use the aromatic compound as a solvent medium as well as a reactant, a mole ratio of aromatic compound to olefin of about 10:1 or greater should be used. Generally, a mole ratio varying over the range from about 10:1 to 1,000:1 can be employed. It is preferred to use a mole ratio varying over the range 10:1 to 150:1.

When the palladium(II) carboxylate is not soluble in the aromatic compound, a cosolvent selected from halogenated hydrocarbons or halohydrocarbons can be employed in the reaction medium to dissolve the palladium salt. Only an amount sufficient to completely dissolve the reactants need be employed although larger amounts may be used. Suitable solvents include, but are not limited to, methylene chloride, chlorobenzene, carbon tetrachloride, chloroform, dichloroethane, and the like.

The olefin arylation can be conducted at any temperature where reaction occurs for the given reactants, some being more reactive than others. Determination of these temperatures is well within the normal skill of one skilled in the relevant art. Generally a temperature between about 20° to 150°C will be suitable. To minimize side reactions, including polyarylation, it is preferred to normally operate between about 50° to 100°C.

The noncatalytic reactions can be run at atmospheric or elevated pressures. Gaseous olefins such as ethylene can be bubbled into the reaction mixture or charged under pressure to a closed reactor. In the noncatalytic embodiment of this invention, oxygen is excluded. Therefore, it can be run in the presence of an inert atmosphere of nitrogen or the like.

Since the noncatalytic reaction depends upon the presence of palladium(II) carboxylate, the reaction can be run for any period of time necessary to complete the conversion of palladium(II) carboxylate to palladium metal or to allow complete conversion of the olefin to products. However, the product obtained by arylating the olefin may itself be subject to further reaction such as an additional arylation before the complete reduction of the coupling promoter or before the complete reaction of the starting olefin. Therefore, it is wthin the scope of this invention to terminate the reaction prior to the complete reduction of the palladium(II) carboxylate or the complete conversion of the olefin to products in order to maximize the yield of the desired product while minimizing those of side reactions.

This optimum reaction will vary according to the nature of the reactants and other variables such as temperature and mole ratios. However, it is considered to be well within the skill of one experienced in the relevant art to determine for a given reaction an optimum reaction time. Normally this can be done by analyzing aliquots removed at spaced intervals using gas phase chromatography or other suitable analytical techniques. Normally, reaction will be complete within 24 hours. Best results are normally obtained between 0.5 and 10 hours.

The noncatalytic reactions can ordinarily be conducted by charging the olefin, aromatic compound and palladium(II) carboxylate to a reactor. Heating and agitation of the reaction mixture is carried out for the desired length of time. Reaction runs at atmospheric pressure can be run in ordinary glass apparatus. Gaseous reactants are bubbled into the medium. Reactions run at elevated pressures can be conducted in any suitable apparatus such as an autoclave.

Recovery of the desired product can normally be done by filtering the palladium metal formed in the reaction and subjecting the filtrate to a distillation or any other suitable separatory processes.

The olefin arylation and olefin-olefin coupling reactions can be carried out on either a batch or a continuous basis.

EXAMPLE I

Summarized in Table I are the results of a number of representative reaction runs done under noncatalytic conditions. A study of these runs will demonstrate the advantages of this invention.

Runs 1 and 7 done in the presence of acetic acid when compared with runs 2 and 4 show the advantage of this invention over the prior art. In those attempts to prepare stilbene from ethylene and benzene, if the reaction is conducted in the presence of acetic acid, extensive formation of vinyl acetate occurs. However, in the absence of acetic acid there is not normally observed the formation of vinyl acetate.

Runs 3-6 show the effect of varying the reaction time. It can be seen that for the particular conditions involved, the arylation of ethylene with benzene to form styrene is maximized between 1 and 2.5 hours. Longer reaction times result in more extensive by-product formation relative to the desired product. Other runs show the application of the invention to other olefin and aromatic reactants as well as to carboxylates other than acetate.

Catalytic Olefin Arylation

Although the arylation of an olefin can be conveniently carried out in the presence of a palladium(II) carboxylate under conditions which are not catalytic with respect to the palladium(II) carboxylate, it is preferred to use conditions under which the palladium(II) carboxylate acts as a catalyst. For the purposes of this

TABLE 1

| Run No. | Olefin (moles) | Aromatic (moles) | Pd Carboxylate (moles) | $HOA_c$ (moles) | Temp., °C | Time, Hrs. | Products | $S_{Pd}$ | $C_{Pd}$ |
|---|---|---|---|---|---|---|---|---|---|
| 1 | Ethylene[1] | Benzene (1.13) | Acetate (0.015) | 0.460 | Reflux | 6.0 | Vinyl acetate | 38.4 | — |
| 2 | Ethylene[1] | Benzene (1.47) | Acetate (0.015) | — | Reflux | 6.0 | Styrene | 15 | 44.6 |
| 3 | Ethylene[2] (0.010) | Benzene (1.13) | Acetate (0.010) | — | 95-100 | 1.0 | Styrene Stilbene | 50.5 0 | 57.6 |
| 4 | Ethylene[2] (0.010) | Benzene (1.13) | Acetate (0.010) | — | 95-100 | 2.5 | Styrene Stilbene | 49.6 11.3 | 91.5 |
| 5 | Ethylene[2] (0.010) | Benzene (1.13) | Acetate (0.010) | — | 95-100 | 4.0 | Styrene Stilbene 1,1-diphenyl-ethylene | 40.2 trace 10.5 | 96.4 |
| 6 | Ethylene[2] (0.010) | Benzene (1.13) | Acetate (0.010) | — | 95-100 | 7.0 | Styrene Stilbene | 20.1 19.0 | 99+ |
| 7 | Ethylene[3] (0.010) | Benzene (1.13) | Acetate (0.010) | 0.438 | 95-100 | 2.5 | Styrene Stilbene Vinyl acetate | 37.7 0 11.0 | 100 |
| 8 | Ethylene[2] (0.010) | Benzene (0.226) | Acetate (0.010) | — | 95-100 | 2.5 | Styrene Vinyl Acetate | 16.5 — | 98.1 |
| 9 | Ethylene[4] (0.030) | Benzene (1.13) | Acetate (0.010) | — | 95-100 | 2.5 | Styrene Stilbene | 39.6 0 | 100 |
| 10 | Ethylene (0.045) | Benzene (1.71) | Acetate (0.015) | — | 95-100 | 2.5 | Styrene Stilbene | 41.0 2.5 | — |
| 11 | Ethylene[1] (0.010) | Toluene (0.946) | Acetate (0.010) | — | 95-100 | 2.5 | Methylstyrene | 34.3 | 9.15 |
| 12 | Ethylene (0.936) | Benzene (1.13) | Benzoate (0.010) | — | 95-100 | 2.5 | Styrene Acetophenone | 28.5 9.8 | 95.8 |
| 13 | Styrene (0.0049) | Benzene (0.112) | Acetate (0.001) | — | 78-80 | 5.0 | Stilbene | 39.4 | 42.9 |
| 14 | Styrene (0.01) | Nitrobenzene (1.0) | Acetate (0.011) | — | 95-100 | 8.0 | m-Nitro-stilbene | — | — |
| 15 | 1,3-Butadiene (0.054) | Benzene (1.13) | Acetate (0.05) | — | 95 | 1.0 | 1-phenyl-1,3-butadiene | low | 45.3 |
| 16 | Isobutylene[5] (XS) | Benzene (1.13) | Acetate (0.010) | — | 80 | 2.5 | β,β-dimethyl styrene 3-phenyl-2-methyl-1-propene 2,5-dimethyl-2,4-hexadiene 2,5-dimethyl-1,4-hexadiene | 21.9 8.5 19.8 24.0 | 100 |

[1] - Ethylene bubbled through solution at 1 atmosphere at 40 cc/min.
[2] - Ethylene charged to reactor at initial pressure of 20 psig.
[3] - Ethylene charged to reactor at initial pressure of 25 psig.
[4] - Ethylene charged to reactor at initial pressure of 60 psig.
[5] - Isobutylene charged to reactor at initial pressure of 100 psig.

invention, the reaction is said to be catalytic with respect to palladium(II) carboxylate when, on a relative basis, more than one mole of reactive olefinic hydrogen is replaced by aryl groups in the arylation reaction in the presence of a single mole of the coupling promoter. Alternatively, the reaction can be considered to be catalytic with respect to palladium(II) carboxylate when the total yield (as defined above) of all products formed in the reaction exceeds 100 percent.

The advantages to using the catalytic conditions are several. One obvious advantage is that significantly smaller quantities of palladium(II) carboxylate are required than would be necessary under noncatalytic conditions. This is particularly desirable in view of the relatively high cost of palladium compounds. The use of small amounts of palladium(II) carboxylate also reduces the extent of olefin reaction with the carboxylate moiety. Other advantages will be apparent to one skilled in the art.

I have found that the arylation of an olefin in the presence of oxygen and a palladium(II) carboxylate as a catalyst eliminates the need for silver or cupric acetate as required by prior art. Surprisingly, this can be done under an oxygen pressure as low as 50 psig. Use of polar solvents or adjuvants such as acetic acid and the like is not required or advised.

In the prior art, catalytic behavior is usually attributed to the reoxidation of palladium metal, as it is formed, back to the +2 oxidation state which is the form active as a coupling promoter. I have found that palladium(II) carboxylates catalyze reaction when olefin arylation is conducted in the presence of the metal salt and oxygen at about 50 psig or above. Pressures as high as 1,000 psig may be employed. However, some limited catalyst reduction occurs up to about 150 psig. It is preferred, therefore, to conduct the reaction in the presence of oxygen having a pressure varying from about 150 psig to 400 psig. Above 400 psig the reaction remains catalytic but other reactions requiring the presence of oxygen become more evident.

The mole ratio of aromatic to olefin compound may vary over a wide range. A suitable ratio of aromatic to olefin is from 0.1:1 to 1,000:1. However, it is normally desired to use aromatic/olefin mole ratio in excess of 1:1 since the aromatic compound can be the solvent medium as well as a reactant. It is preferred to use a mole ratio varying from about 10:1 to 100:1. In this range olefin-olefin coupling is rendered less significant yet the relative amount of aromatic compound is not so large that recovery of products is hampered.

The mole ratio of olefin to palladium(II) carboxylate may vary over a wide range. Normally a ratio greater than 1:1 will be employed to take advantage of the catalytic effect. At low mole ratios of olefin to coupling promoter, olefin-olefin coupling becomes more significant. At the very high olefin to coupling promoter ratio the reaction becomes too slow to be practical. The optimum mole ratio of olefin to palladium(II) carboxylate can vary depending upon the nature of the reactants and reaction variables such as temperature and the like. Best results normally occur when the mole ratio of olefin to palladium carboxylate varies over the range from about 10:1 to 100:1.

The palladium(II) carboxylate must be dissolved in the reaction medium. In those cases where the palladium(II) carboxylate is not soluble in the aromatic reactant a cosolvent selected from halocarbons or halohydrocarbons may be employed. Normally the amount of cosolvent employed will be a minimum amount necessary to dissolve the palladium salt although larger amounts may be used. Suitable cosolvents include but are not limited to carbon tetrachloride, chlorobenzene, methylenedichloride, chloroform, dichloroethane, and the like.

The temperature at which the process is conducted will normally be about room temperature and above. When the aromatic compound is to be employed as the reaction medium and is a solid at ordinary temperatures, the temperature must at least be above its melting point. Normally, it is expected to operate the reaction from about 20° to 150°C. It is preferred to operate between about 50° and 100°C.

The reaction can be conducted for a period of time sufficient to cause complete conversion of the starting olefin ($C_o$). However, as the reaction progresses and the concentration of products increases, side reactions such as polyarylation become more important. Therefore, it may be desirable to interrupt the reaction at a time when the olefin conversion is not complete in order to optimize the yield of desired product. The optimum time can depend upon the nature of the reactants and operating condition chosen such as temperature, mole ratios of reactants, and the like.

The selection of an optimum operating time is considered to be within the skill of one experienced in relevant art. One manner in which it can be done is to examine aliquots, taken periodically from the reaction, by vapor phase chromatography or other suitable technique. By observing the nature of the product mixture as it varies with time, the time at which maximization of the desired product occurs relative to unreacted starting material and products of side reactions can be determined.

Normally the reaction process is carried out by charging to the reactor the aromatic compound and coupling promoter. The reactor is then flushed with oxygen and then pressurized with oxygen to the desired pressure. Heating and agitating are then begun.

The olefin may be charged to the reactor with the aromatic compound and coupling promoter. However, at the initially high olefin concentrations, olefin-olefin coupling as a side reaction occurs to a greater extent. Incremental or continuous addition of the olefins during the reaction was found to reduce the extent to which this side reaction occurs. Therefore, it is preferred to introduce the olefin in small increments or meter it into the center continuously at a slow rate.

Solid or liquid olefins can normally be continuously added by pumping them into the reactor as a solution in the aromatic compound or other suitable solvent. Gaseous olefins can be added continuously by bubbling into the reaction vessel using any suitable means, preferably through a frit. It is preferred to dilute them in oxygen so as to reduce the concentration of olefin at the point where added. A two percent concentration in oxygen has been used satisfactorily in the phenylation of ethylene.

Runs up to 300 psig of oxygen may be safely conducted in Fisher-Porter aerosol compatibility bottles. At higher pressures, glass-lined autoclaves or other similar apparatus should be employed.

EXAMPLES

The following examples are composed of runs made under a variety of conditions in order to demonstrate the operability and advantages of this invention. For convenience, the individual runs are presented in tabular form.

EXAMPLE II

The following reaction runs, set out in Table II, demonstrate the effect of adding the starting olefin as a single aliquot at the start of the reaction or continuously during the reaction. In the actual reactions employed the olefin is styrene and the aromatic compound is benzene. Palladium(II) acetate was used as the coupling promoter.

and yield of stilbene, the desired product from the phenylation of styrene, results when the starting olefin is added continuously (see runs 2 and 4). By comparison, runs 1 and 3, wherein all the styrene was added at once, results in a greater proportion of products derived from olefin-olefin coupling and oxidative reactions.

EXAMPLE III

The reaction runs in Table III demonstrate the effect of changing the oxygen pressure relative to other variables for the reaction of styrene and benzene. In each run the benzene to styrene molar ratio was 17:1 and the styrene to palladium(II) acetate molar ratio was 26:1.

TABLE II

| Run No. | Benzene/ Styrene Mole Ratio | Styrene/ Pd (OAc)$_2$ Mole Ratio | Temp. °C | Psig O$_2$ | Time Hrs. | $C_o$ | Products | $S_o$ | Yield | Mode of Addition |
|---|---|---|---|---|---|---|---|---|---|---|
| 1 | 17 | 26 | 80 | 300 | 5.5 | 74.3 | Stilbene | 14.4 | 314 | Single Aliquot |
|   |    |    |    |     |     |      | Acetophenone | 35.0 | 764 |  |
|   |    |    |    |     |     |      | Benzaldehyde | 11.6 | 253 |  |
|   |    |    |    |     |     |      | 1,4-diphenyl-1,3-butadiene | 9.7 | 105 |  |
|   |    |    |    |     |     |      | $\phi$CH$_2$CHO | 9.2 | 199 |  |
| 2 | 16 | 29 | 80 | 300 | 6.0 | 68.3 | Stilbene | 34.2 | 674 | Continuous[1] |
|   |    |    |    |     |     |      | Acetophenone | 28.2 | 555 |  |
|   |    |    |    |     |     |      | Benzaldehyde | 8.1 | 159 |  |
|   |    |    |    |     |     |      | 1,4-diphenyl-1,3-butadiene | 7.9 | 78 |  |
| 3 | 17 | 26 | 80 | 150 | 5.5 | 67.8 | Stilbene | 11.9 | 238 | Single Aliquot |
|   |    |    |    |     |     |      | Acetophenone | 20.8 | 417 |  |
|   |    |    |    |     |     |      | Benzaldehyde | 6.3 | 13 |  |
|   |    |    |    |     |     |      | 1,4-diphenyl-1,3-butadiene | 15.0 | 150 |  |
| 4 | 17 | 23 | 80 | 150 | 6.0 | 61.7 | Stilbene | 27.6 | 460 | Continuous[1] |
|   |    |    |    |     |     |      | Acetophenone | 15.1 | 252 |  |
|   |    |    |    |     |     |      | Benzaldehyde | 5.9 | 98 |  |
|   |    |    |    |     |     |      | 1,4-diphenyl-1,3-butadiene | 8.4 | 70 |  |

[1]Styrene added continuously during run as a 3:1 vol.:vol. solution in benzene. The molar ratio of benzene to styrene was not calculated based on this added benzene.

From a comparison of the data presented in Table II it can be seen that an improvement in selectivity (So)

Each run was conducted for 5.5 hours at 80°C. Styrene was added as a single aliquot.

TABLE III

EFFECT OF OXYGEN PRESSURE

| Run No. | Psig O$_2$ | $C_o$ | Products | $S_o$ | Yield | % Catalyst Reduction |
|---|---|---|---|---|---|---|
| 1 | 50 | 40.0 | Stilbene | 14.6 | 172 | 33 |
|   |    |      | Acetophenone | 19.3 | 238 |  |
|   |    |      | Benzaldehyde | 3.8 | 45 |  |
|   |    |      | 1,4-diphenyl-1,3-butadiene | 23.2 | 136 |  |
| 2 | 100 | 61.0 | Stilbene | 14.5 | 261 | 5 |
|   |     |      | Acetophenone | 29.5 | 531 |  |
|   |     |      | Benzaldehyde | 10.5 | 189 |  |
|   |     |      | 1,4-diphenyl-1,3-butadiene | 13.3 | 119 |  |
| 3 | 150 | 67.8 | Stilbene | 11.9 | 238 | 0 |
|   |     |      | Acetophenone | 20.8 | 417 |  |
|   |     |      | Benzaldehyde | 6.3 | 13 |  |
|   |     |      | 1,4-diphenyl-1,3-butadiene | 15.0 | 150 |  |
| 4 | 200 | 67.2 | Stilbene | 14.2 | 281 | 0 |
|   |     |      | Acetophenone | 34.0 | 672 |  |
|   |     |      | Benzaldehyde | 14.7 | 292 |  |
|   |     |      | 1,4-diphenyl-1,3-butadiene | 8.6 | 85 |  |
| 5 | 300 | 74.5 | Stilbene | 14.4 | 314 | 0 |
|   |     |      | Acetophenone | 35.0 | 764 |  |
|   |     |      | Benzaldehyde | 11.6 | 253 |  |
|   |     |      | 1,4-diphenyl-1,3-butadiene | 9.7 | 105 |  |
|   |     |      | $\phi$CH$_2$CHO | 9.2 | 199 |  |

It can be seen from the data presented in Table III that the reaction was catalytic even at an oxygen pressure as low as 50 psig. However, catalyst reduction to the extent of 33 percent occurred. As the oxygen pressure is increased the extent of catalyst reduction decreases. Above 100 psig no catalyst reduction occurred.

It can also be seen that increasing the oxygen pressure increases the relative proportions of products such as benzaldehyde and acetophenone produced by the oxidation of styrene.

EXAMPLE IV

The reaction runs in Table IV demonstrate the effect of increasing the amount of palladium(II) acetate relative to the amount of olefin for the reaction of styrene and benzene in the presence of palladium(II) acetate.

lyst to olefin is increased still further. The drop in yield based on catalyst in run no. 4 compared to runs 2 and 3 reflects this although the actual yield of styrene (the stoichiometric yield of stilbene from the styrene charged) is approximately the same. The drop in actual yield in run no. 4 compared to runs 2 and 3 is believed due to increased olefin-olefin coupling.

EXAMPLE V

The reaction runs in Table V demonstrate the effect of varying the temperature from the reaction of styrene with benzene in the presence of palladium(II) acetate.

By comparing runs 1 and 2 it can be seen that increasing the temperature from 77° to 100°C accelerates the rate of reaction. This is apparent from the observation that more olefin is consumed in 5 hours at 100°C than is consumed in 6 hours 77°C. The increase in rate

TABLE IV

EFFECT OF CATALYST LEVEL

| Run No. | Benzene/ Styrene Molar Ratio[1] | Styrene/ Pd(OAc)$_2$ Molar Ratio | Temp. °C | Time Hrs. | Psig O$_2$ | C$_o$ | Product | S$_o$ | Yield | Actual Yield[2] |
|---|---|---|---|---|---|---|---|---|---|---|
| 1 | 15 | 88 | 80 | 6.0 | 300 | 20.5 | Stilbene | 19.5 | 451 | 4 |
| 2 | 16 | 29 | 80 | 6.0 | 300 | 68.3 | Stilbene | 34.2 | 674 | 23 |
| 3 | 18 | 26 | 80 | 6.0 | 300 | 63.0 | Stilbene | 38.0 | 613 | 24 |
| 4 | 14 | 16 | 80 | 6.0 | 300 | 63.2 | Stilbene | 29.0 | 292 | 18 |

[1]Styrene was added continuously as a 3:1 vol.:vol. solution in benzene. The molar ratio of benzene to styrene was not calculated based on this added benzene.
[2]Actual yield is the percent stoichiometric yield of stilbene based on molar amount of styrene added.

TABLE V

EFFECT OF TEMPERATURE

| Run No. | Benzene (moles) | Styrene[1] (moles) | Pd(OAc)$_2$ (moles) | Temp.[2] °C | Time Hrs. | Psig O$_2$ | C$_o$ | Styrene Consumed (moles) | Products | S$_o$ | Yield |
|---|---|---|---|---|---|---|---|---|---|---|---|
| 1 | 1.02 | 0.080 | 0.0025 | 77 | 6.0 | 300 | 41.5 | 0.03 | Stilbene | 32.7 | 436 |
| 2 | 1.02 | 0.225 | 0.0025 | 100 | 5.0 | 300 | 62.1 | 0.14 | Stilbene | 19.7 | 1100 |

[1]All olefin added at beginning of run.

It can be seen that decreasing the molar ratio of styrene to palladium(II) acetate (increasing the amount of palladium(II) acetate relative to the amount of styrene) increases the rate of reaction of styrene as measured by increasing C$_o$ relative to elapsed time. At an olefin:-catalyst molar ratio below about 30, no increase in reaction rate is observed as the relative amount of catais accompanied by a lower selectivity (So) to stilbene, the desired product.

EXAMPLE VI

The reaction runs in Table VI demonstrate the effect of varying the anion attached to the palladium(II) carboxylate for the arylation of styrene with stilbene.

TABLE VI

EFFECT OF ANION

| Run No. | Benzene (moles) | Styrene[1] (moles) | Pd(II) Carboxylate (moles) | Temp. °C | Psig O$_2$ | Time Hrs. | C$_o$ | Product | S$_o$ | Yield |
|---|---|---|---|---|---|---|---|---|---|---|
| 1 | 0.0694 | 1.13 | Benzoate 0.0025 | 80 | 300 | 6.0 | 56.4 | Stilbene | 44.6 | 730 |
| 2 | 0.0640 | 1.13 | Acetate 0.0025 | 80 | 300 | 6.0 | 63 | Stilbene | 38 | 613 |
| 3 | 0.0655 | 1.13 | Propionate 0.0022 | 80 | 300 | 5.5 | — | Stilbene | — | 370 |
| 4 | 0.935 | 0.025 | Monochloro-acetate[2] 0.0021 | 80 | 300 | 6.0 | 18.0 | Stilbene | 80.5 | 468 |
| 5 | 0.060 | 1.13 | Acetyl-acetonate 0.025 | 80 | 300 | 6.0 | — | None | — | — |

[1]Styrene was added continuously as a 3:1 vol.:vol. solution in benzene. The moles of benzene given in the table were not calculated based on this benzene.
[2]Palladium(II) monochloroacetate demonstrates catalytic activity for only a short time.

It can be seen from runs 1–4 in Table VI that palladium(II) carboxylates having a variety of carboxylate anions effectively promote olefin arylation. However, when the anion is acetylacetonate, a less labile anion than a carboxylate, no olefin occurs.

EXAMPLE VII

The reaction runs compiled in Table VII demonstrate the applicability of this reaction to a variety of olefin and aromatic substrates.

this invention are solvents that are liquids at room temperature although low melting solids can also be employed. It is preferred that if a solid is used its melting point be less than 150°C. Suitable solvents include but are not limited to chloroform, carbon tetrachloride, methylene dichloride, chloroethane and the like.

The volume of solvent employed may vary over a wide range. The minimum amount that may be employed is that sufficient to entirely dissolve the palladium(II) carboxylate and olefin reactant. Normally suffi-

TABLE VII

MISCELLANEOUS REACTANTS

| Run No. | Aromatic (moles) | Olefin (moles) | Pd (OAc)$_2$ (moles) | Temp. °C | Time Hrs. | Psig O$_2$ | C$_o$ | Products | S$_o$ | Yield |
|---|---|---|---|---|---|---|---|---|---|---|
| 1 | Benzene 1.13 | Vinyl-cyclohexane[1] 0.0236 | 0.0025 | 80 | 2.5 | 300 | 345 | 1-cyclohexyl-2-phenyl-ethylene | 51.3 | 177 |
| 2 | Benzene 1.13 | Allyl Acetate 0.024 | 0.0025 | 80 | 2.5 | 300 | — | $\phi$CH=CHCH$_2$OA$_c$ | — | low |
| 3 | Benzene 1.13 | Cyclohexane[1] 0.021 | 0.0025 | 80 | 2.5 | 300 | — | 1- and 4-phenyl-cyclohexane | — | 114 |
| 4 | Benzene 1.13 | p-chloro-[1] styrene 0.025 | 0.0025 | 80 | 2.5 | 300 | 68.2 | p-chloro-stilbene | 31.4 | 214 |
|   |   |   |   |   |   |   |   | p-chloroacetophenone |   | 81.4 |
| 5 | Chlorobenzene 0.098 | Styrene[1] 0.025 | 0.0025 | 80 | 2.5 | 300 | 72.9 | Chloro-stilbene[3] | 14.9 | 108 |
| 6 | Benzene 1.13 | Ethylene[2] 0.138 | 0.0045 | 100 | 5.5 | 300 | — | Styrene | — | 580 |
|   |   |   |   |   |   |   |   | Stilbene | — | 192 |

[1]All olefin added at beginning of run.
[2]Ethylene was added continuously as a 2 percent mixture in oxygen.
[3]The chlorostilbene was a mixture of ortho, meta and para isomers.

CATALYTIC OLEFIN-OLEFIN COUPLING

In the case of olefin arylation described above, it was seen that olefin-olefin coupling is a competing reaction that regularly occurs. This reaction was particularly important when the starting olefin concentration was high. I have found that olefin-olefin/coupling itself can be carried out in a manner that is catalytic with respect to the palladium(II) carboxylate coupling promoter. This may be done by conducting the reaction in an inert solvent and in the presence of the previously specified oxygen content. Of course, it is preferred to conduct the reaction in the absence of an aromatic compound.

The same reaction variables applicable to the catalytic olefin arylation described are applicable to olefin-olefin coupling with the necessary elimination of the aromatic compound.

As in the case of olefin arylation, the palladium(II) carboxylate must be soluble in the reaction medium. Suitable solvents must necessarily be inert under the reaction conditions and can be selected from halogenated paraffin hydrocarbons. Most preferred for use in cient solvent will be employed to insure that throughout the reaction the mixture remains in the fluid state. For this purpose the ratio of the volume in liters of solvent to moles of olefin can vary over a wide range. Suitable ratios may vary over the range from about 0.1:1 to 10:1. It is preferred to use about 1 liter of solvent per mole of olefin reactant.

The same apparatus and reaction technique used for catalytic olefin arylation can be employed for olefin-olefin coupling. However, unlike olefin arylation, it is not preferred to use incremental or continuous olefin addition. Instead, it is preferred to charge the olefin and coupling promoter together in the solvent when beginning the reaction as olefin-olefin coupling is enhanced at higher concentrations of olefin.

EXAMPLE VIII

Experimental runs set forth in Table VIII demonstrate the applicability of this invention to olefin-olefin coupling. In these runs the olefin employed is styrene and the product is 1,4-diphenyl-1,3-butadiene.

TABLE VIII

OLEFIN-OLEFIN COUPLING

| Run No. | Styrene (moles) | Solvent (moles) | Pd (OAC)$_2$ (moles) | Temp. °C | Time Hrs. | Psig O$_o$ | C$_o$ | Products | S$_o$ | Yield[2] |
|---|---|---|---|---|---|---|---|---|---|---|
| 1 | 0.096 | CHCl$_3$ 100 | 0.0045 | 49 | 5 | 380 | 29.1 | trans,trans-DPBDE[1] | 5.0 | 31 |
|   |   |   |   |   |   |   |   | cis,trans-DPBDE[1] | 10.6 | 67 |
|   |   |   |   |   |   |   |   | acetophenone | 17.8 | 111 |
|   |   |   |   |   |   |   |   | benzaldehyde | 5.2 | 32 |

TABLE VIII—Continued

OLEFIN-OLEFIN COUPLING

| Run No. | Styrene (moles) | Solvent (moles) | Pd (OAC)$_2$ (moles) | Temp. °C | Time Hrs. | Psig O$_o$ | C$_o$ | Products | S$_o$ | Yield[2] |
|---|---|---|---|---|---|---|---|---|---|---|
| 2 | 0.096 | CHCl$_3$ 100 | 0.0045 | 60 | 5 | 300 | 37.5 | trans,trans-DPBDE[1] | 8.4 | 67 |
|   |   |   |   |   |   |   |   | cis,trans-DPBDE[1] | 15.0 | 100 |
|   |   |   |   |   |   |   |   | acetophenone | 30.5 | 244 |
|   |   |   |   |   |   |   |   | benzaldehyde | 7.6 | 61 |
| 3 | 0.096 | CHCl$_3$ 100 | 0.0045 | 80 | 5 | 300 | 53.2 | trans,trans-DPBDE[1] | 9.8 | 111 |
|   |   |   |   |   |   |   |   | cis,trans- | 5.1 | 58 |
|   |   |   |   |   |   |   |   | acetophenone | 30.8 | 351 |
|   |   |   |   |   |   |   |   | benzaldehyde | 26.2 | 298 |
| 4[3] | 0.096 | Heptane 100 | 0.0045 | 100 | 5 | 300 | 63.1 | trans,trans-DPBDE[1] | 4.8 | 66 |
|   |   |   |   |   |   |   |   | acetophenone | 15.4 | 210 |
|   |   |   |   |   |   |   |   | benzaldehyde | 18.8 | 255 |

[1]DPBDE is an abbreviation for 1,4-diphenyl-1,3-butadiene.
[2]A small amount of Pd° was formed in all runs.
[3]Some polystyrene was obtained as a reaction product.

It can be seen from the data presented in Table VIII that olefin-olefin coupling may be conducted in a variety of solvents including hydrocarbon and halohydrocarbon solvents (see runs 3 and 4).

The olefin-olefin coupling in runs 1–4 results in a mixture of trans,trans-1,4-diphenyl-1,3-butadiene and cis,trans-1,4-diphenyl-1,3-butadiene. At lower temperatures the cis,trans-isomer predominates (see runs 1 and 2). At higher temperatures the trans,trans-isomer predominates (see runs 3 and 4). Furthermore, as the temperature increases olefin conversion is greater but there is produced relatively more acetophenone and benzaldehyde, products of the oxidation of styrene.

The products of the catalytic, oxidative coupling reactions described above (olefin arylation and olefin coupling) are useful monomers and/or comonomers in polymerization processes. Additionally, these products are useful starting materials for oxidation processes, and as reactive chemical intermediates in a variety of synthesis applications including e.g., the production of flame retardants, epoxy resin components, protective coatings, polymer additives such as stabilizers against photodegradation, agricultural chemicals, perfume bases and in numerous other applications.

I claim:

1. A process for olefin coupling comprising contacting styrene with a palladium(II) carboxylate coupling promoter in the presence of an inert solvent and oxygen wherein the pressure of said oxygen is at least about 50 psig.

2. A process according to claim 1 wherein said solvent is a paraffinic hydrocarbon or halocarbon compound and said carboxylate contains up to and including 10 carbon atoms.

3. A process according to claim 1 wherein said carboxylate is acetate and said solvent is chloroform.

4. A process according to claim 1 wherein the mole ratio of styrene to palladium(II) carboxylate varies over the range 10:1 to 100:1, said oxygen pressure varies from 150 psig to 400 psig, and said contacting occurs at a temperature between about 50° and 100°C for a time varying from about 0.5 to 10 hours.

* * * * *